United States Patent [19]

Rese

[11] Patent Number: 4,820,056
[45] Date of Patent: Apr. 11, 1989

[54] FLUIDIZATION APPARATUS

[75] Inventor: Arkadijus Rese, Trübbach, Switzerland

[73] Assignee: Wagner International AG, Switzerland

[21] Appl. No.: 34,209

[22] Filed: Apr. 2, 1987

[30] Foreign Application Priority Data

Apr. 2, 1986 [DE] Fed. Rep. of Germany ....... 3611039

[51] Int. Cl.[4] .............................................. B01F 11/00
[52] U.S. Cl. .................................... 366/101; 366/108; 366/114; 366/124; 366/128; 366/191
[58] Field of Search ............... 366/101, 102, 103, 104, 366/105, 106, 107, 165, 124, 126, 108, 117, 118, 119, 182, 111, 123, 110, 114, 128, 209–211

[56] References Cited

U.S. PATENT DOCUMENTS

| 2,255,799 | 9/1941 | Meinzer | 366/111 |
| 2,875,988 | 3/1959 | Wysong | 366/124 |
| 2,960,316 | 11/1960 | McKellar | 366/124 |
| 2,969,038 | 1/1961 | Neumann | 366/101 |
| 3,281,125 | 10/1966 | Shoe et al. | 366/111 |
| 3,684,253 | 8/1972 | Bevan | 366/108 |
| 4,184,771 | 1/1980 | Day | 366/165 |
| 4,207,005 | 6/1980 | Stanfield | 366/123 |
| 4,511,256 | 4/1985 | Karg et al. | 366/165 |
| 4,586,854 | 5/1986 | Newman et al. | 366/165 |
| 4,604,029 | 8/1986 | Fink | 366/124 |

Primary Examiner—Harvey C. Hornsby
Assistant Examiner—Joseph S. Machuga
Attorney, Agent, or Firm—Hill, Van Santen, Steadman & Simpson

[57] ABSTRACT

A fluidization apparatus for powder coating devices is provided which comprises a housing that is subdivided by a porous horizontal wall into an upper housing portion and a lower housing portion. The lower housing portion is provided with a compressed air feed. The upper housing portion is provided with a connecting conduit to an injector fed with compressed air and is provided with a powder feed above and through its cover. The lower housing portion is a cylinder having a circular floor area in which an air turbine is mounted and which includes an unbalanced mass. The upper housing portion is a cuboid having a quadratic floor area, whereby the length of a quadratic side corresponds to the length of the diameter of a filter mat having the shape of a circular disk, the filter mat separating the upper and lower housing portions.

10 Claims, 2 Drawing Sheets

FLUIDIZATION APPARATUS

BACKGROUND OF THE INVENTION

1. Field of the Invention

The present invention relates to a fluidization apparatus for powder-coating devices of the type comprising a housing which is subdivided by a porous horizontal wall into an upper housing portion and a lower housing portion, a compressed air feed for the lower housing portion and a powder feed for the upper housing portion, whereby a connecting line to an injector, fed with compressed air, departs from the upper housing portion, the injector withdrawing a powder-air mixture from the upper housing portion and conveying the same to the powder coating device.

2. Description of the Prior Art

The known, commercially-available fluidization apparatus for preparation of a powder-air mixture and the conveyance thereof, for example, via a hose, to a powder coating device, i.e. a powder gun comprise a housing which is subdivided by a horizontal wall of porous material, for example a filter material, whereby the powder located above the porous partition is whirled up and placed into a suspended condition by compressed air fed through the porous partition from below. The "fluidized" powder located above the porous partition is then withdrawn from the upper housing portion by way of an injector and is transported to the powder gun via the hose. A disadvantage of this known fluidization apparatus is that they are relatively large, heavy and bulky and that clumping of the powder can occur despite the turbulence of the air, particularly during pauses in coating.

SUMMRY OF THE INVENTION

It is therefore an object of the present invention to improve fluidization apparatus of the type set forth above such that they are relatively small, handy and simple in structure, whereby an excellent fluidization effect should nonetheless be guaranteed with the risk of clump formation.

According to the present invention, the above is achieved in fluidization apparatus of the type set forth above which is particularly characterized in that the lower housing portion is constructed as a cylinder having a circular floor area and receives an air turbine comprising an unbalanced mass whereby the cover wall of the lower housing portion is filter mat, and in that the upper housing portion comprises an opening in its floor identical in size to the size of the filter mat and has its cover side connected to the open floor of a powder container.

In the apparatus of the invention therefore, an air turbine comprising an unbalanced mass is located in the lower housing portion, the exhaust air of the air turbine serving as fluidization air and placing the entire housing in vibration. The powder is therefore not fluidized only by means of the compressed air, but is also mechanically loosened by the vibrations, so that no clump formation can occur. As a consequence of constructing the lower housing portion as a circular cylinder and constructing the upper housing portion as a cuboid, corner regions occur in the upper housing portion which are not flooded from below with compressed air which, as tests have shown, yield regions of particularly uniform fluidization. Despite these functional advantages, the apparatus of the invention is relatively simple in structure, small in terms of its dimensions and is easy to manipulate.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
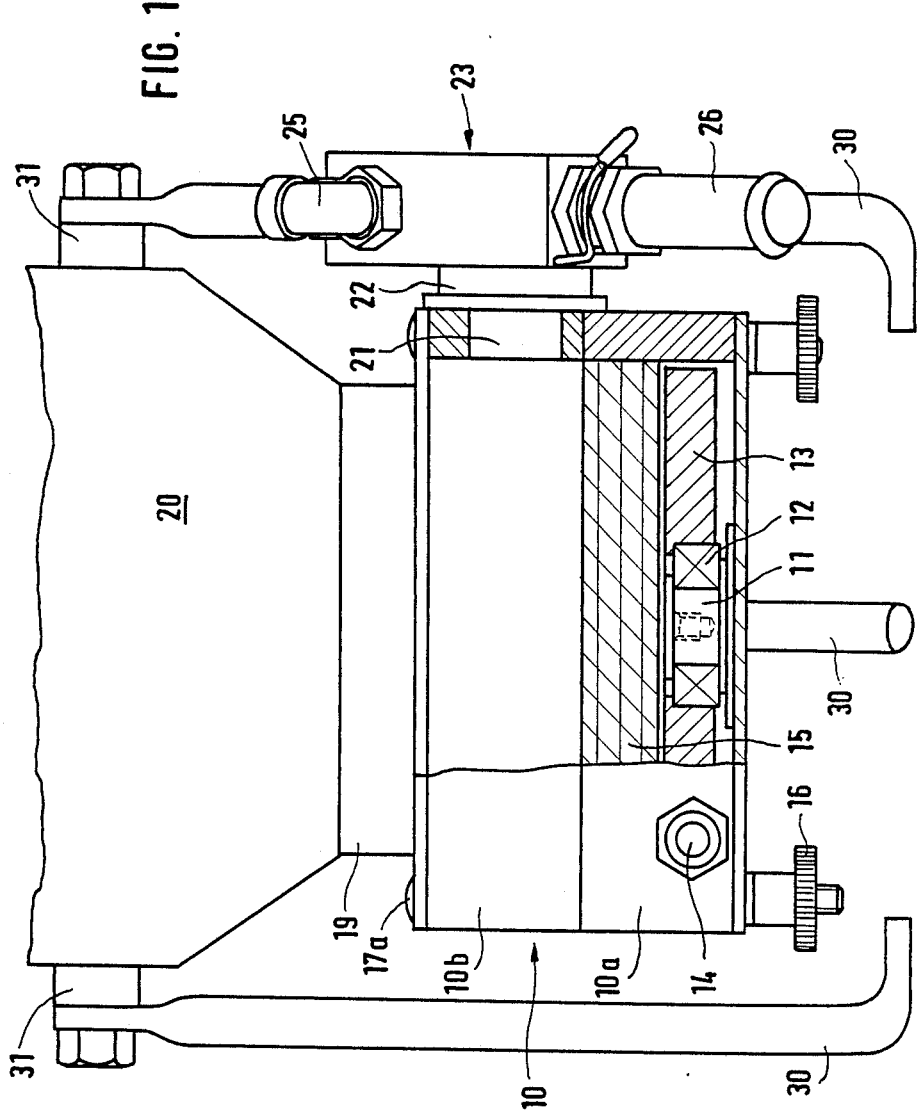
FIG. 1 is a front view, shown partially in section of the apparatus constructed in accordance with the present invention.
Figure 2:
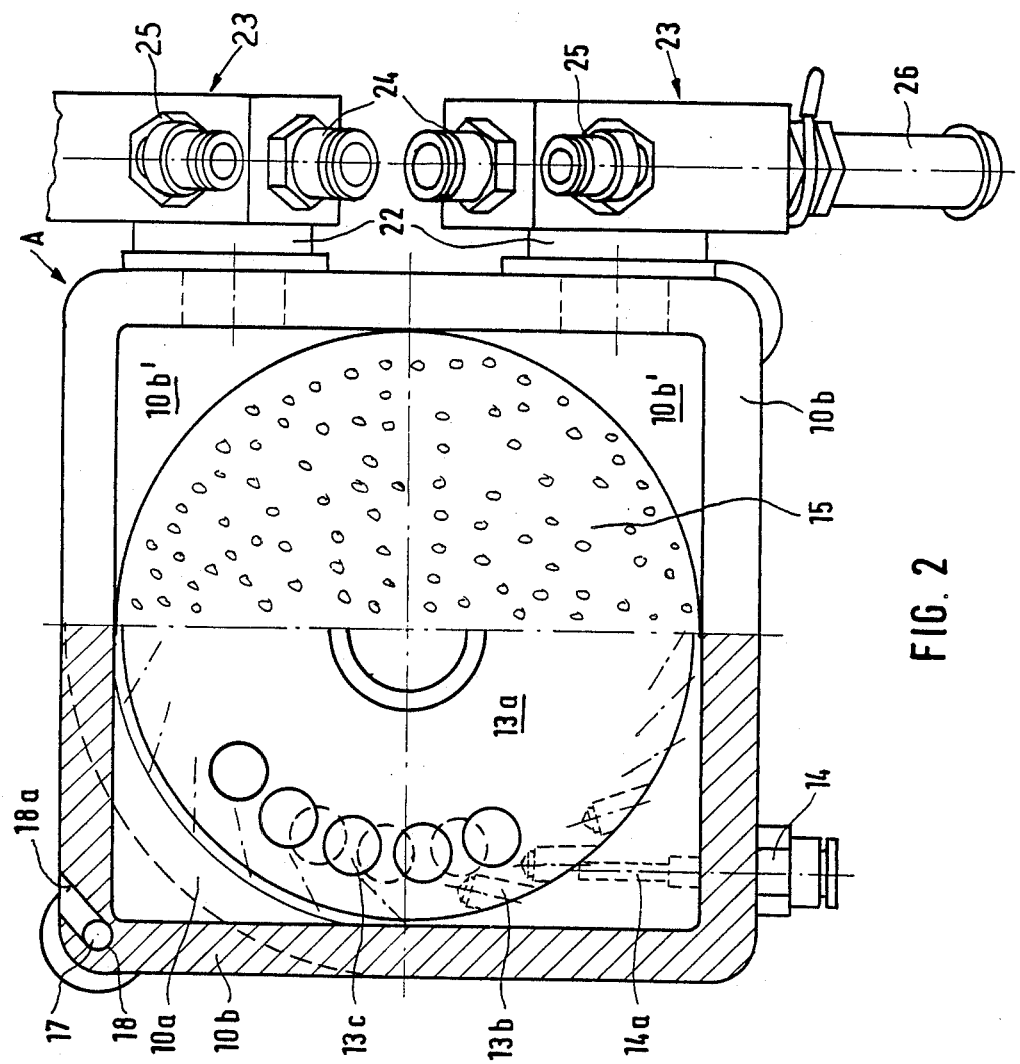
FIG. 2 is a plan view, also partially in section, of the apparatus in FIG. 1, whereby the powder reservoir and the housing cover, as well as a portion of the filter mat have been removed.

Referring to the drawings, the apparatus comprises a housing 10 composed of two housing portions arranged above one another, namely a lower housing portion 10a and an upper housing portion 10b. The lower housing portion 10a is cylindrical, i.e. its inner bottom surface has the shape of a circular disk. An air turbine 13 is rotatably seated by way of a bearing 12 on a vertical shaft 11 which projects centrally from the floor of the lower housing portion 10a. The air turbine 13 is composed of a rotor 13a in the form of an annular disk whose circumferential edge around its entirety is provided with obliquely set admission ports 13b and whose surface is provided with unbalance recesses 13c over the region of a sector. A compressed air connection 14 includes a nozzle 14a which is directed onto the edge of the rotor 13a such that the nozzle access essentially aligns with the axis of the admission port 13b located immediately in front. At its upper side, the lower housing portion 10a is provided with a filter mat 15 closing the lower housing portion, this being constructed as a multi-layer structure in this exemplary embodiment. Two knurled nuts 16 project downwardly from the lower floor side of the lower housing portion 10a, the knurled nuts 16 being screwed onto two screws 17 lying diagonally opposite one another, whereby the screws 17 extend through the vertical sidewall of the lower housing portion 10a and project upwardly over a length which corresponds to the height of the upper housing portion 10b. The upper, free ends of the screws 17 are fashioned as rivet-like screw heads 17a. The upper housing portion 10b has the shape of a cuboid having a quadratic bottom area, whereby the length of one cuboid side is equal to the diameter of the bottom surface of the lower housing portion 10a. At opposite corners, the upper housing portion 10b comprises vertical bores 18 having a lateral opening slot 18a such that the upper housing portion 10b can be slipped onto the lower housing portion 10a in the direction of the arrow A in FIG. 2, whereby the two upwardly projecting screw lengths of the screws 17 slide into the bores 18, whereupon a firm connection between the upper and lower housing portion is produced by tightening the knurled nuts 16. The bottom surface 10b' of the upper housing portion 10b is cut out in a circular manner, whereby the diameter of the opening is essentially identical to the diameter of the filter mat 15, so that the inner space of the lower housing portion 10a is in communication with the inner space of the upper housing portion 10b via the filter mat 15. The upper housing portion 10b is provided with a cover likewise having a quadratic shape which is tensed relative to the upper housing portion 10b or, respectively, relative to the housing 10 by way of the screws 17. The cover is thereby in communication with the housing of a powder cup 20 via a cylindrical portion 19, the upper region of the powder cup 20 being cut away in FIG. 2. Finally, the upper housing portion 10b comprises a lateral opening 21 which is in communication with the input of an injector 23 which is flanged to the housing 10. The injector 23 includes an input 24 for injector air, an input 25 for no-load air and a discharge 26 for the powder-air mixture. The injector nozzle located in the interior of the injector 23 and connected to the inputs 24 and 25 is not shown in the drawing. A plurality of such injectors 23, a maximum of four, can be attached to the upper housing portion 10b, in particular in the arrangement illustrated in FIG. 2.

The unit composed of the housing 10, the powder container 20 and the injector 23 is elastically seated in a four-legged stand 30 as suggested by the drawing, in which rubber bumpers are provided.

When compressed air is supplied via the compressed air connection 14 and is directed against the turbine rotor 13a by the nozzle 14a, then the turbine rotor 13a is placed into rotation, whereby the revolutions per minute depend on the strength of the compressed air jet. Due to the rotation of the turbine rotor 13a which, of course, comprises an unbalanced mass as a consequence of the recesses 13c, mechanical vibrations arise, these being transmitted via the bearing 12 and the shaft 11 to the entire housing 10 elastically seated in the stand 30. A further consequence of the compressed air feed is that, as exhaust air of the air turbine 13, the same flows through the filter mat 15 into the interior of the upper housing portion 10b. Powder which has fallen from the powder container 20 into the interior of the upper housing portion 10b and fills the latter is now, first of all, loosened by the vibrational motions and, secondly, is brought into a suspended condition (fluidized) by the air flowing out of the upper surface of the filter mat 15. This fluidized condition is particularly formed in the corners of the upper housing portion 10b, i.e. surprisingly over the corner regions of the floor 10b'. The reason for this may, first, lie in the turbulance of the air and, secondly, in the fact that their is no powder column of the container 20 above these regions. For this reason, the outlet openings 21 and the connections 22 of the injectors 23 are also arranged such that they depart from the greater fluidization of these corner regions. When, in particular, compressed air is now supplied to the injector via the line 24, then fluidized powder, i.e. a powder-air mixture having powder uniformly distributed in the air, is sucked out of the corner region by the injector effect, being sucked out through the opening 21 and the connection 22 and being supplied to the discharge connection 26 from which it is supplied via a line (not shown), preferably a hose, to a spray device which is likewise not shown. The through-put quantity of powder-air mixture can thereby be controlled by the compressed air feed to the input 24.

Given interruptions in the spraying process of the spray device, i.e. in the pauses in spraying, one can proceed such that a valve for the feed of compressed air to the connection 14 and a valve for the feed of compressed air to the connection 24 are closed simultaneously with the closing of the standard value of the spray device, for instance in that all three valves are fashioned as solenoid values correspondingly connected to one another. However, a clump formation of the powder in the upper housing portion 10b, in the injector 23 and in the connecting hose to the spray device could thereby occur. In order to prevent this, one advantageously proceeds such that the compressed air feed to the connection 14 is simultaneously reduced with the closing of the valve of the spray device, the valve to the connection 24 is closed and a valve to the no-load connection 25 is opened. Given a closed spray device, this means that a relatively small quantity of compressed air is admitted into the lower housing portion 10a so that the air turbine 13 turns slowly and the housing 10 therefore vibrates slightly and a reduced fluidization effect is also preserved. The compressed air supplied to the small connection 25, however, prevents fluidized powder from proceeding into the injector and into the connecting hose to the spray device; on the contrary, a pressure equilibrium between the interior of the upper housing portion 10b, the injector 23 and the connecting hose will be established. Excess air will emerge toward the exterior via the powder container 20. When the valve of the spray device is opened again, full fluidization can again be immediately carried out.

Of course, the invention can be subject to numerous modifications. Therefore, for example, it is possible to seat the rotor eccentrically instead of providing the unbalanced mass receses 13c. The connection between the lower housing portion 10a, the upper housing portion 10b with its cover and the powder container 20 can also occur in some other structural way.

Although I have described my invention by reference to particular illustrative embodiments thereof, many changes and modifications of the invention may become apparent to those skilled in the art without departing from the spirit and scope of the invention. I therefore intend to include within the patent warranted hereon, all such changes and modifications as may reasonably and properly be included within the scope of my contribution to the art.

I claim:

1. A powder fluidization apparatus comprising:
   a housing having an upper portion and a lower portion separated by an airpermeable filter, said upper housing portion having a floor with an opening substantially the same size as said filter;
   means for feeding powder to said upper portion of said housing;
   an air turbine mounted in said lower portion of said housing;
   means for rotating said air turbine and for generating an air flow through said filter to fluidize said powder in said upper portion of said housing;
   said air turbine having an unbalanced mass so that said turbine, during rotation, mechanically vibrates said housing and said powder therein to assist in fluidizing said powder; and
   means connected to said upper portion of said housing for entraining the fluidized powder therein in a further air flow for discharging the entrained, fluidized powder from said upper portion of said housing.

2. The fluidization apparatus of claim 1, and further comprising:
   a resilient stand mounting said housing.

3. The fluidization apparatus of claim 2, wherein:
   said air turbine comprises a disk-shaped rotor, a vertical shaft mounting said rotor, and said rotor including a circumferential edge having obliquely extending air admission ports.

4. The fluidization apparatus of claim 3, wherein:
the unbalanced mass of said rotor comprises recesses in a sector of said rotor.

5. The fluidization apparatus of claim 1, wherein:
said filter is a multi-layered structure.

6. The fluidization apparatus of claim 5, further comprising a cover closing said upper housing portion, and wherein:
said means for feeding powder comprises a powder container and a cylindrical connection between said powder container and said cover of said upper housing portion.

7. The fluidization apparatus of claim 6, and further comprising:
a plurality of screws and a corresponding plurality of knurled nuts tensing said upper and lower housing portions.

8. The fluidization apparatus of claim 1, wherein:
said means for entraining the fluidized powder is an injector;
said upper housing portion is rectangular and includes corners; and
said injector is mounted adjacent a corner.

9. The fluidization apparatus of claim 1, wherein:
said upper housing portion is rectangular and includes corners; and
said means for entraining the fluidized powder comprises a plurality of injectors and each injector is mounted adjacent a corner of said upper housing portion.

10. The fluidization apparatus of claim 1, wherein:
said means for entraining the fluidized powder includes a compressed air feed conduit for no-load operation.

* * * * *